United States Patent [19]

Emery et al.

[11] Patent Number: 5,308,588
[45] Date of Patent: May 3, 1994

[54] HERMETICALLY SEALED CONTAINER FOR AIR BAG INFLATOR

[75] Inventors: Jerome W. Emery, Tempe; Timothy A. Swann; John P. O'Loughlin, both of Mesa, all of Ariz.; Michael F. Daly, Rochester Hills, Mich.

[73] Assignee: TRW Inc., Lyndhurst, Ohio

[21] Appl. No.: 117,483

[22] Filed: Sep. 7, 1993

Related U.S. Application Data

[63] Continuation of Ser. No. 629,141, Dec. 18, 1990, abandoned.

[51] Int. Cl.⁵ ............................................. B01J 7/00
[52] U.S. Cl. .................................... 422/165; 102/530; 102/531; 280/731; 280/736; 280/741; 422/166
[58] Field of Search ................... 422/165, 166, 305; 102/530, 531; 280/741, 731, 740, 736, 743

[56] References Cited

U.S. PATENT DOCUMENTS

| | | | |
|---|---|---|---|
| 3,944,251 | 3/1976 | Lynch | 102/531 |
| 3,985,076 | 10/1976 | Schneiter et al. | 280/741 |
| 4,013,010 | 3/1977 | Schneiter et al. | 280/740 |
| 4,136,894 | 1/1979 | Ono et al. | 280/729 |
| 4,296,084 | 10/1981 | Adams et al. | 423/351 |
| 4,547,342 | 10/1985 | Adams et al. | 422/166 |
| 4,590,041 | 5/1986 | Hill | 422/165 |
| 4,734,265 | 3/1988 | Nilsson et al. | 422/165 |
| 4,907,819 | 3/1990 | Cuevas | 280/736 |
| 5,062,367 | 11/1991 | Hayashi et al. | 280/741 |

OTHER PUBLICATIONS

Ford Engineering Material Specification (3 Pages) Number ESB-M46-226-A dated approximately 1980 and describing a two-component room temperature curing thermally conductive epoxy sealer.

Technical Drawings (7 Sheets) including Ford Product Engineering drawings: (1) EIVB-54042B68-AB dated 1985; (2) (number not legible) dated (unknown); (3) EIVB-54043B87-AB dated 1984; (4) EIVB-54043B-86-AB dated 1980; (5) EIVB-54042B66-AB dated 1984; (6) EIVB-54042B69-AA dated 1984; and (7) Talley Industries drawing 91967 dated Jul. 23, 1987.

Primary Examiner—Lyle A. Alexander
Assistant Examiner—Laura E. Collins
Attorney, Agent, or Firm—Tarolli, Sundheim & Covell

[57] ABSTRACT

An apparatus for inflating a vehicle occupant restraint, such as an air bag, includes a housing. A hermetically sealed canister in the housing includes a lower section and a cover. Gas generating material is located in the canister. The gas generating material, when ignited, generates gas for inflating the air bag. The canister is sealed with a single hermetic seal between the lower section and the cover.

7 Claims, 3 Drawing Sheets

HERMETICALLY SEALED CONTAINER FOR AIR BAG INFLATOR

This is a continuation of copending application(s) Ser. No. 07/629,141 filed on Dec. 18, 1990, now abandoned.

BACKGROUND OF THE INVENTION

1. Technical Field

The present invention relates to a gas generating device, and particularly to an inflator for inflating an air bag to protect an occupant of a vehicle.

2. Description of the Prior Art

It is well known to protect a vehicle occupant by using an air bag that is inflated when the vehicle encounters sudden deceleration, such as in a collision. The air bag restrains movement of the vehicle occupant during the collision. The air bag is typically inflated by gas generated by activation of gas generating material. The gas generating material is contained in an air bag inflator.

The gas generating material of an air bag inflator can absorb moisture from the air. The performance of the gas generating material upon activation can be adversely affected by the absorption of moisture. Also, if the gas generating material absorbs enough moisture from the air, an undesired chemical reaction can take place between the moisture and the gas generating material and corrosion of metal parts of the inflator can occur.

Accordingly, the gas generating material is commonly enclosed in a hermetically sealed enclosure. The hermetically sealed enclosure prevents large amounts of air, and thus large amounts of moisture in the air, from coming into contact with the gas generating material over the lifetime of the air bag inflator. A hermetic seal may be defined as a seal which has an equivalent helium leak rate of less than $1 \times 10^{-5}$ cubic centimeters per second of helium at one atmosphere pressure differential measured at a specified temperature between $-50°$ C. and $110°$ C.

SUMMARY OF THE INVENTION

The present invention is an apparatus for inflating a vehicle occupant restraint. The apparatus includes a housing and a canister located in the housing. Gas generating material is located within the canister. When ignited, the gas generating material generates gas for inflating the vehicle occupant restraint. The canister includes only two parts which are connected with a single hermetic seal. In a preferred embodiment, the single hermetic seal is a crimped connection between the two parts of the canister.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT OF THE INVENTION

Figure 1:
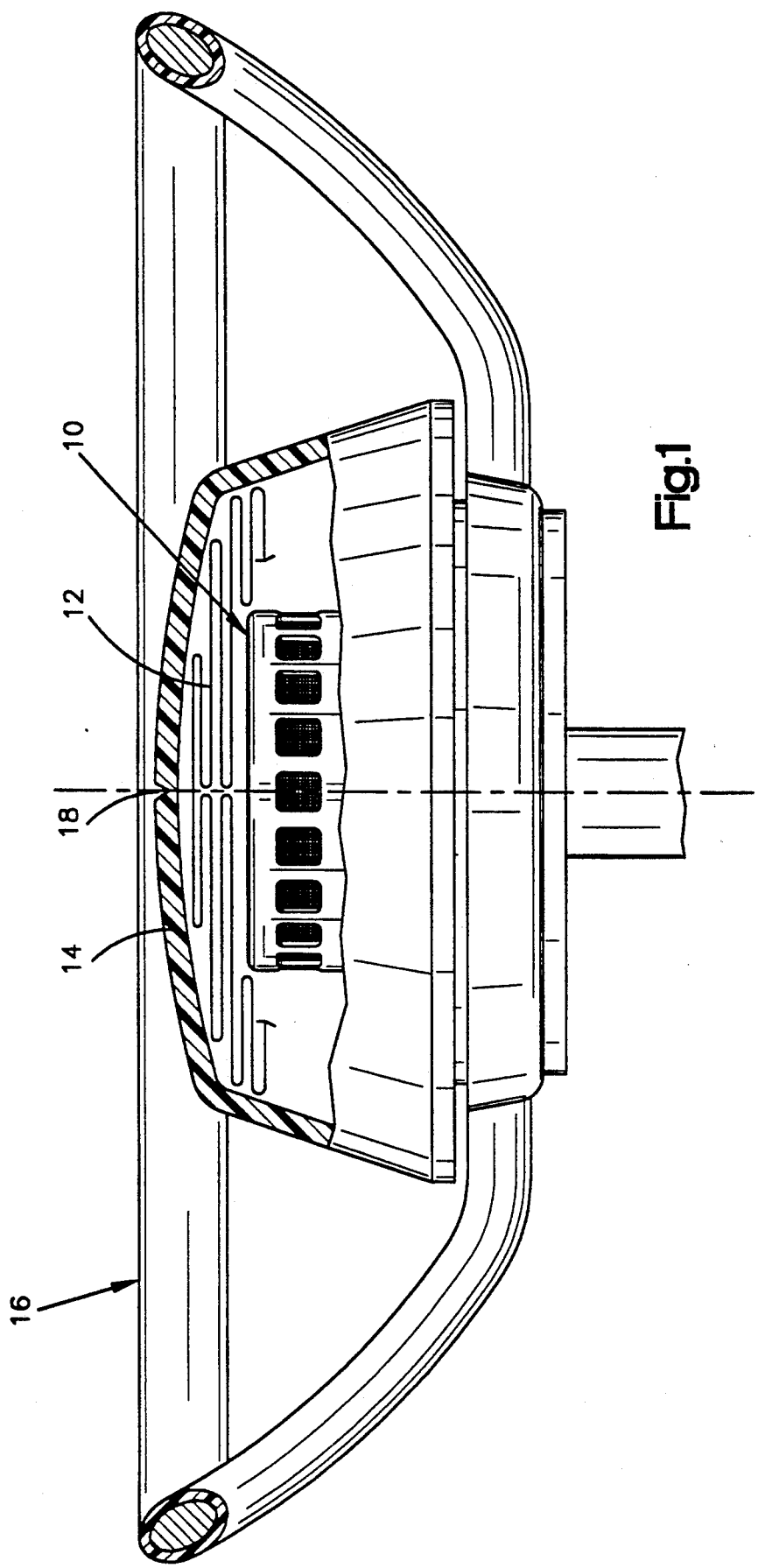
FIG. 1 is a transverse view, partially in section, of a vehicle steering wheel with an inflatable occupant restraint module incorporating an inflator constructed in accordance with the present invention.

The present invention relates to an air bag inflator and particularly to an inflator for inflating an air bag to protect the driver of a vehicle. The present invention is applicable to various inflator constructions. As representative of the present invention, FIG. 1 illustrates an inflator 10. An air bag 12 is folded around the inflator 10. A cover 14 encloses the air bag 12 and the inflator 10. The inflator 10, the air bag 12, and the cover 14 are components of a module which is mounted on a vehicle steering wheel 16.

Upon the occurrence of sudden vehicle deceleration, such as occurs in a collision, the inflator 10 is energized and produces a large volume of gas. The gas from the inflator 10 expands the air bag 12. As the air bag 12 starts to expand, it breaks weakened portions in the cover 14. One of the weakened portions is designated 18 in FIG. 1. As the air bag 12 continues to expand, it moves into the space between the driver of the vehicle and the steering wheel 16 to restrain movement of the driver, as is known.

Figure 2:
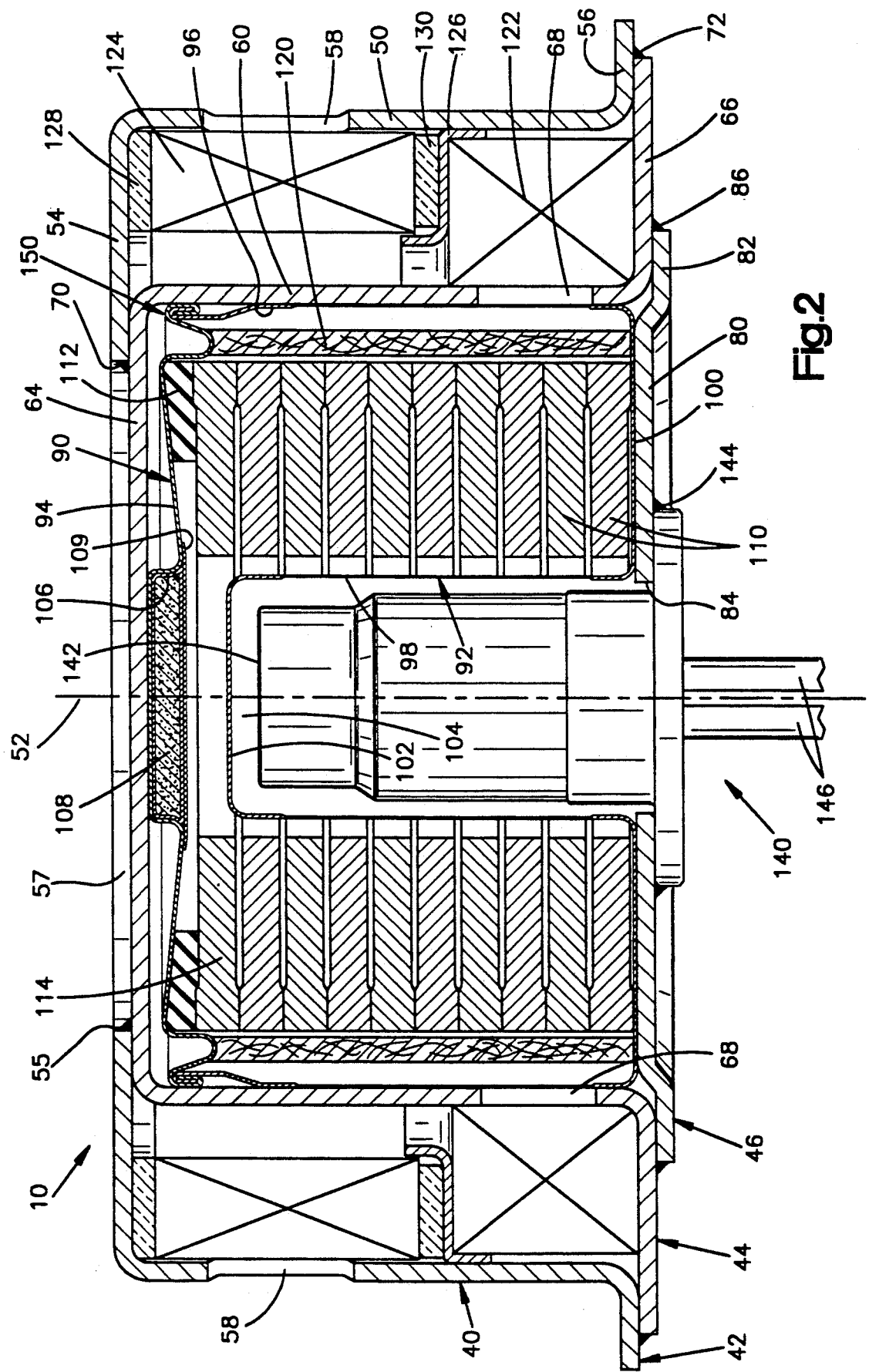
FIG. 2 is a transverse view, partially in section, of the inflator of FIG. 1 including a hermetically sealed canister containing gas generating material.

The inflator 10 (FIG. 2) includes a housing 40. The housing 40 is made of three pieces, namely, a diffuser cup 42, a combustion cup 44, and a combustion chamber cover 46. The diffuser cup 42, the combustion cup 44, and the combustion chamber cover 46 are made of a metal, such as UNS S30100 stainless steel.

The diffuser cup 42 is generally cup-shaped and has a cylindrical side wall 50 extending around the central axis 52 of the inflator 10. The side wall 50 extends between a flat upper end wall 54 and a flat lower flange 56. An inner annular surface 55 on the upper end wall 54 of the diffuser cup 42 defines a central opening 57 in the upper end wall 54. The end wall 54 and the flange 56 are generally parallel to each other and perpendicular to the axis 52. An annular array of gas outlet openings 58 extends circumferentially around an upper portion of the diffuser cup side wall 50.

The combustion cup 44 is generally cup-shaped and is disposed inside the diffuser cup 42. The combustion cup 44 has a cylindrical side wall 60 extending around the axis 52. The cylindrical side wall 60 extends between a flat upper end wall 64 and a flat lower flange 66. The upper end wall 64 and the lower flange 66 are generally parallel to each other and perpendicular to the axis 52. An annular array of openings 68 extends circumferentially around a lower portion of the combustion cup side wall 60.

The upper end wall 64 of the combustion cup 44 is welded with a continuous weld to the annular surface 55 on the upper end wall 54 of the diffuser cup 42 at a circumferential weld location 70, preferably by laser welding. The combustion cup flange 66 is welded with a continuous weld to the diffuser cup flange 56 at a circumferential weld location 72, also preferably by laser welding.

The combustion chamber cover 46 is a generally flat metal piece having a circular center portion 80 and a parallel but slightly offset annular outer flange 82. A circular opening 84 is located in the center portion 80 of the chamber cover 46. The outer flange 82 of the chamber cover 46 is welded with a continuous weld to the combustion cup flange 66 at a circumferential weld location 86, again preferably by laser welding.

A hermetically sealed canister 90 is disposed in the combustion cup 44 The canister 90 is made of only two pieces, namely a lower canister section 92 and a cover 94. The radially outer edge of the canister cover 94 is crimped to an adjacent edge of the canister lower section 92 to seal the canister 90 hermetically. The canister 90 is made of an air impermeable material and preferably made of a relatively thin metal, such as aluminum. The material of which the canister 90 is made has an equivalent leak rate of no greater than $1 \times 10^{-5}$ cubic centimeters per second of helium at one atmosphere pressure differential measured at a specified temperature between $-50°$ C. and $110°$ C.

The canister lower section 92 has a cylindrical outer side wall 96 adjacent to and inside the combustion cup side wall 60. The side wall 96 has a reduced thickness in the area adjacent the openings 68 in the combustion cup side wall 60. The canister lower section 92 also has a cylindrical inner side wall 98 spaced radially inwardly from the outer side wall 96. The side wall 98 has a reduced thickness in the area adjacent an igniter 142.

A flat ring-shaped lower wall 100 of the canister lower section 92 interconnects the outer side wall 96 and the inner side wall 98. A circular inner top wall 102 of the canister lower section 92 extends radially inwardly from and caps the inner side wall 98. The inner top wall 102 and the cylindrical inner side wall 98 define a downwardly opening central recess 104 in the canister 90.

The canister cover 94 is generally circular in shape. A recess 106 is located in the center of the canister cover 94. A packet 108 of auto ignition material is located in the recess 106 and held in the recess 106 by a piece of aluminum foil tape 109.

A plurality of annular disks 110 of gas generating material are stacked atop each other within the canister 90. An annular cushion 112 is disposed between the uppermost gas generating disk 114 and the inside of the canister cover 94. The disks 110 are made of a known material which, when ignited, generates nitrogen gas. Although many types of gas generating material could be used, suitable gas generating materials are disclosed in U.S. Pat. No. 3,895,098.

An annular prefilter 120 is disposed in the canister 90. The prefilter 120 is located radially outward of the gas generating disks 110 and radially inward of the outer side wall 96 of the canister 90. A small annular space exists between the prefilter 120 and the outer side wall 96.

An annular slag screen indicated schematically at 122 is located in the diffuser cup 42, outside of the combustion cup 44. The slag screen 122 is disposed radially outward of the openings 68 and contacts the combustion cup side wall 60. However, the slag screen 122 could be spaced away from the combustion cup side wall 60.

An annular final filter assembly indicated schematically at 124 is located inside the diffuser cup 42 above the slag screen 122. The final filter assembly 124 is radially inward of the gas outlet openings 58 in the side wall 50 of the diffuser cup 42. The final filter assembly 124 is a plurality of layers of various materials. The layers extend around the diffuser cup side wall 50 and are located inside the side wall. The detailed structure of the final filter assembly 124 does not form a part of the present invention and therefore will not be described in detail.

An annular filter shield 126 projects radially inwardly from the diffuser cup side wall 50 and separates the final filter assembly 124 and the slag screen 122. An annular graphite seal 128 seals the gap between the upper edge of the final filter assembly 124 and the inside of the diffuser cup upper end wall 54 Another annular graphite seal 130 seals the gap between the lower edge of the final filter assembly 124 and the upper side of the filter shield 126.

The inflator 10 includes an initiator assembly 140. The initiator assembly 140 projects through the opening 84 in the chamber cover 46 into the central recess 104 of the canister 90. The initiator assembly 140 is welded with a continuous weld, preferably a laser weld, to the center portion 80 of the chamber cover 46 at a circumferential weld location 144.

The initiator assembly 140 includes the igniter 142. The igniter 142 includes a pair of wire leads 146 which extend outwardly from the initiator assembly 140. The wire leads 146 are connectable to a collision sensor (not shown). The wire leads 146 are connected to a resistance wire embedded in an ignition material in the igniter 142. The igniter 142 may be of any suitable well known construction. A thin plastic film (not shown) is located on the outside of the upper portion of the igniter 142, to prevent metal-to-metal contact which could ground the igniter 142 and disable the inflator 10.

Upon the occurrence of a collision or other sudden vehicle deceleration, the collision sensor closes an electrical circuit. An electrical current then flows through the wire leads 146 to the igniter 142. The resistance wire sets off the ignition material which ignites a charge in the igniter 142. Ignition of the charge forms hot gas products which flow outwardly from the igniter 142 and rupture the inner top wall 102 and the inner side wall 98 of the canister 90. The hot gas from the igniter 142 ignites the disks 110 of gas generating material. The disks 110 of gas generating material rapidly produce a large volume of another hot gas.

The pressure of the gas acts on the cylindrical side wall 96 of the canister 90, forcing the side wall 96 radially outwardly against the combustion cup side wall 60. This results in the thin side wall 96 of the canister 90 being ruptured or blown out at the openings 68 in the combustion cup side wall 60. The reduced thickness of the side wall 96 adjacent the openings 68 allows this portion of the side wall 96 to rupture in preference to other portions at a desired pressure. The gas generated by burning of the disks 110 then flows radially outwardly through the prefilter 120. The prefilter 120 removes from the flowing gas some combustion products of the initiator assembly 140 and of the gas generating disks 110. The prefilter 120 cools the flowing gas. When the gas cools, molten products such as metal are plated onto the prefilter 120. The gas flows through the openings 68 and into the slag screen 122.

The slag screen 122 removes and traps particles from the flowing gas. The slag screen also cools the flowing gas. When the gas cools, molten combustion products such as metal are plated onto the slag screen 122. The filter shield 126 between the slag screen 122 and the final filter assembly 124 causes turbulent flow of gas to occur in and around the slag screen 122. The turbulent gas flow promotes the retention of relatively heavy particles in the slag screen 122 and in the lower portion of the diffuser cup 42.

The gas flows axially upwardly from the slag screen 122 to the final filter assembly 124. The gas then flows radially outwardly through the final filter assembly 124 which removes small particles from the gas. The final filter assembly 124 also further cools the gas so that molten products in the gas may deposit on parts of the final filter assembly 124. The annular array of gas outlet openings 58 directs the flow of gas into the air bag 12 to inflate the air bag 12.

Referring in greater detail to the hermetically sealed canister 90, the outer side wall 96 of the canister lower section 92 (FIG. 3) includes an annular lower wall portion 152. An annular connector portion 154 extends axially upwardly and radially inwardly from the lower wall portion 152. An annular locator portion 156 of the outer side wall 96 extends axially upwardly from the connector portion 154. The locator portion 156 is narrower in diameter than the lower wall portion 152. An annular ring portion 158 projects radially outwardly from the upper end of the locator portion 156.

The canister cover 94 includes a circular top wall portion 160 centered on the axis 52 of the inflator 10. An annular side wall portion 162 extends axially downwardly from the outer periphery of the top wall portion 160. The top wall portion 160 and the side wall portion 162 define the recess 106. As it extends downwardly from the top wall portion 160, the side wall portion 162 curves radially outwardly into a radially extending annular portion 164 of the canister cover 94.

Figure 4:
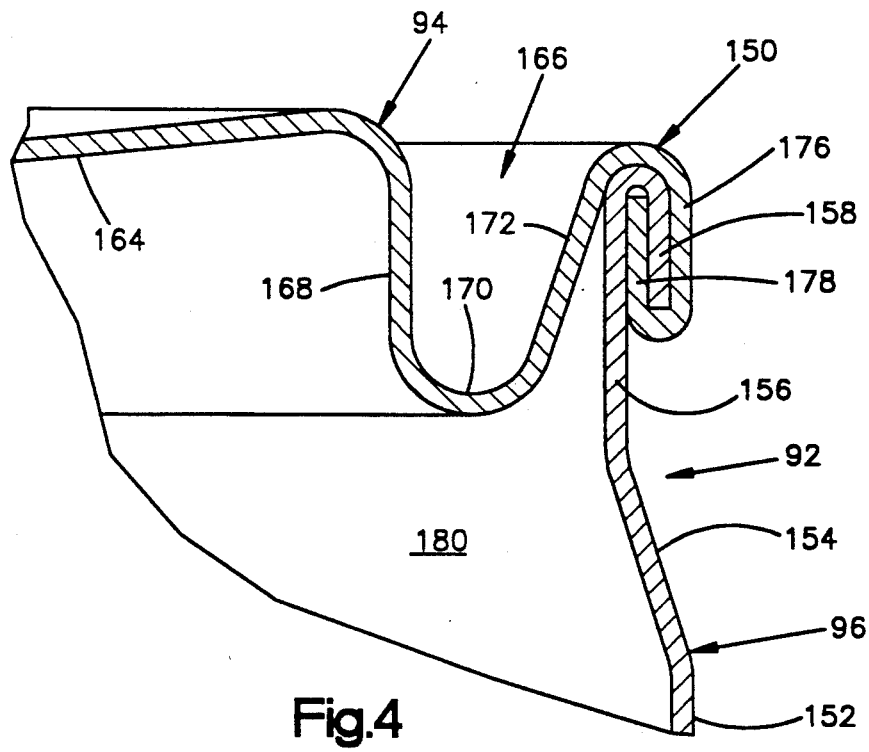
FIG. 4 is a view showing the hermetic seal between the parts of the canister of FIG. 3.

An annular rib portion 166 of the canister cover 94 is located radially outward of the annular portion 164. The rib portion 166 is U-shaped in section and has an inner wall 168 (FIG. 4) extending axially downwardly from the annular portion 164. A curved bottom wall 170 of the rib portion 166 extends radially outwardly from the inner wall 168. An outer wall 172 of the rib portion 166 extends axially upwardly from the bottom wall 170.

An annular flange portion 174 (FIG. 3) projects radially outwardly from the outer wall 172. The flange portion 174 includes a first ring portion 176 and a second ring portion 178. The second ring portion 178 is curled axially downwardly and radially inwardly toward the first ring portion 176. A thin layer of a sealant compound is preferably applied to an area 179 on the axially downwardly facing side of the flange portion 174. The sealant compound is preferably a water-based latex rubber and clay material available as DAREX compound 9307 from Dewey and Almy Chemical Division of W. R. Grace and Co. of San Leandro, Calif. The sealant compound assists in obtaining a hermetic seal between the flange portion 174 and the ring portion 158 of the canister lower section 92.

Figure 3:
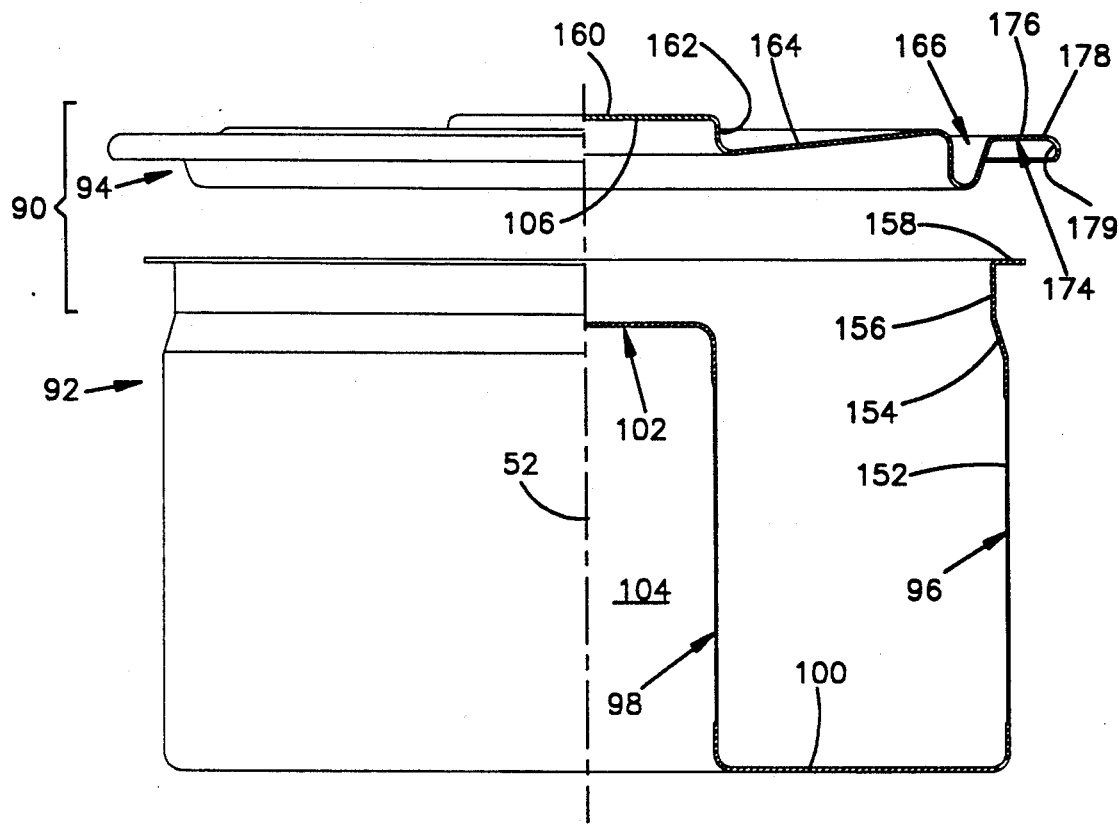
FIG. 3 is a view, partially in section, of the parts of the canister of FIG. 2, in an unassembled condition.

In assembly of the canister 90, the canister cover 94 is positioned over the canister lower section 92 as shown in FIG. 3. The canister cover 94 is then moved axially onto the canister lower section 92. The first ring portion 176 on the canister cover 94 engages the ring portion 158 on the canister lower section 92. The second ring portion 178 on the canister cover 94 is folded around and under the ring portion 158 of the canister lower section 92, so that the flange portion 174 of the canister cover 94 encloses the ring portion 158 of the canister lower section 92. The portions 158 and 176 are then bent to the position shown in FIG. 4 in which the second ring portion 178 engages the locator portion 156 of the lower canister section 92. This is commonly known as a double seam.

The locator portion 156 and the ring portions 158, 176 and 178 comprise a single hermetic seal 150. The single hermetic seal 150 connects the canister lower section 92 with the canister cover 94. The canister lower section 92 and the canister cover 94 together define a chamber 180 which is sealed by the single hermetic seal 150. The gas generating material 110 is located within the chamber 180 in the hermetically sealed canister 90. Thus, air or moisture from outside the canister 90 cannot enter the canister 90 and contact the gas generating material 110. The small amount of air which may be sealed in the chamber 180 with the gas generating material 110 does not contain enough moisture to affect the gas generating material adversely.

The intent of the present invention is to prevent excessive moisture from the air from contacting the gas generating material over the life of the inflator. Thus, not only does the seal 150 prevent air from entering the canister 90, but also the canister is made of a material which prevents air from entering the canister over the life of the inflator. As further developments are made in inflators including changes in gas generating material, it is contemplated that the acceptable leak rate of the single hermetic seal may change. Also, a leak rate for the single hermetic seal which is acceptable may vary for different users of the vehicle occupant restraint systems, such as different vehicle manufacturers. Accordingly, the present invention is not necessarily limited to the definition of a hermetic seal set forth above.

From the above description of the invention, those skilled in the art will perceive improvements, changes and modifications. Such improvements, changes and modifications within the skill of the art are intended to be covered by the appended claims.

We claim:

1. Apparatus for inflating a vehicle occupant restrain comprising:

a hermetically sealed canister having a chamber;

gas generating material in said chamber, said gas generating material when ignited generating gas for inflating a vehicle occupant restraint; and an igniter for igniting said gas generating material to generate gas for inflating the vehicle occupant restraint;

said canister being made of only two parts;

said two parts of said canister comprising a canister lower section defining said chamber and a canister cover for closing said chamber, said gas generating material being located in said chamber in said canister lower section;

said canister cover comprising one single piece of metal including a circular central wall portion and a first projecting ring portion extending radially outwardly from the circular central wall portion;

said canister lower section comprising one piece of metal and including a cylindrical outer side wall having an upper end and a lower end, a projecting ring portion at said upper end of said outer side wall, a cylindrical inner side wall spaced radially inward of said outer side wall and having an upper end and a lower end, a ring-shaped lower wall interconnecting said lower ends of said inner and outer side walls, and a circular inner top wall extending radially inwardly from said upper end of said inner side wall and capping said inner side wall;

said projecting ring portion of said canister cover and said projecting ring portion of said canister lower section being crimped together to form an annular seal joining said two parts of said canister;

said two parts of said canister having only a single hermetic seal between them, said single hermetic seal comprising said annular seal joining said canister cover to said canister lower section;

said cylindrical inner side wall of said canister lower section and said circular inner top wall of said canister lower section defining a central recess extending into said canister, said igniter being received in said recess and outside of said chamber of said canister.

2. Apparatus as set forth in claim 1 wherein said circular central wall portion of said canister cover comprises a circular central top wall and an annular side wall extending downwardly from the outer edge of the top wall and defining therewith an auto-ignition packet recess, said canister cover having an annular rib located radially outward of the auto-ignition packet recess, said rib having a downwardly extending inner wall, a curbed bottom wall extending outwardly and an outer wall extending upwardly from the bottom wall, said canister cover first projecting ring portion extending radially outwardly from the rib outer wall.

3. Apparatus as set forth in claim 2 wherein said cylindrical inner side wall of said canister lower section has a reduced thickness in the area adjacent said igniter.

4. Apparatus as set forth in claim 3 wherein said cylindrical inner side wall of said canister lower section has a reduced thickness in the area adjacent the combustion cup openings.

5. Apparatus for inflating a vehicle occupant restraint comprising:

a hermetically sealed canister having a chamber;

gas generating material in said chamber, said gas generating material when ignited generating gas for inflating a vehicle occupant restraint; and an igniter for igniting said gas generating material to generate gas for inflating the vehicle occupant restraint;

said canister being made of only two parts;

said two parts of said canister comprising a canister lower section defining said chamber and a canister cover for closing said chamber, said gas generating material being located in said chamber in said canister lower section;

said canister cover comprising one single piece of metal including a circular central top wall and an annular side wall extending downwardly from the outer edge of the top wall and defining therewith an auto-ignition packet recess, said canister cover having an annular rib located radially outward of the auto-ignition packet recess, said rib having a downwardly extending inner wall, a curved bottom wall extending outwardly and an outer wall extending upwardly from the bottom wall, and said canister cover having a first projecting ring portion extending radially outwardly from the rib outer wall;

said canister lower section comprising one piece of metal and including a cylindrical outer side wall having an upper end and a lower end, a projecting ring portion at said upper end of said outer side wall, a cylindrical inner side wall spaced radially inward of said outer side wall and having an upper end and a lower end, a ring-shaped lower wall interconnecting said lower ends of said inner and outer side walls, and a circular inner top wall extending radially inwardly from said upper end of said inner side wall and capping said inner side wall;

said projecting ring portion of said canister cover and said projecting ring portion of said canister lower section being crimped together to form an annular seal joining said two parts of said canister;

said two parts of said canister having only a single hermetic seal between them, said single hermetic seal comprising said annular seal joining said canister cover to said canister lower section;

said cylindrical inner side wall of said canister lower section and said circular inner top wall of said canister lower section defining a central recess extending into said canister, said igniter being received in said recess and outside of said chamber of said canister.

6. Apparatus as set forth in claim 5 wherein said cylindrical inner side wall of said canister lower section has a reduced thickness in the area adjacent said igniter.

7. Apparatus as set forth in claim 6 wherein said cylindrical inner side wall of said canister lower section has a reduced thickness in the area adjacent the combustion cup openings.

* * * * *

UNITED STATES PATENT AND TRADEMARK OFFICE
CERTIFICATE OF CORRECTION

PATENT NO. : 5,308,588

DATED : May 3, 1994

INVENTOR(S) : Jerome W. Emery et al.

It is certified that error appears in the above-identified patent and that said Letters Patent is hereby corrected as shown below:

On the title page:
The inventorship should include --Douglas Campbell, Denver, Co.--.

Signed and Sealed this

Thirteenth Day of June, 1995

*Attest:*

BRUCE LEHMAN

*Attesting Officer*    *Commissioner of Patents and Trademarks*